United States Patent [19]

Reinten

[11] Patent Number: 4,839,672

[45] Date of Patent: Jun. 13, 1989

[54] EXPOSURE DEVICE AND PRINTER WITH AN LED ARRAY

[75] Inventor: Hans Reinten, Velden, Netherlands

[73] Assignee: Oce-Nederland B.V., Venlo, Netherlands

[21] Appl. No.: 215,219

[22] Filed: Jul. 5, 1988

[30] Foreign Application Priority Data

Jul. 7, 1987 [NL] Netherlands ................. 8701592

[51] Int. Cl.$^4$ ........................................... G01D 15/00
[52] U.S. Cl. ...................................... 346/160; 346/154
[58] Field of Search ........... 346/160, 154, 108, 107 R, 346/76 L; 358/300, 302; 101/DIG. 13; 400/119; 350/332, 333, 331 T

[56] References Cited

U.S. PATENT DOCUMENTS 4,720,717  1/1988  Ohta et al. ........................... 346/154
4,757,332  7/1988  Yuasa .................................. 346/160

*Primary Examiner*—Arthur G. Evans
*Attorney, Agent, or Firm*—Reed Smith Shaw & McClay

[57] ABSTRACT

An exposure device for the image-wise exposure of a photosensitive layer by means of an LED array, whereby the cumulative loading of each LED over a specific time interval is determined, and on the basis thereof in a correction interval each LED is subjected to a specific extra loading equal to the difference between the maximum LED loadings and the subject LED cumulative loading so that at the expiration of the correction interval all the LED's have experienced equal aging.

6 Claims, 2 Drawing Sheets

EXPOSURE DEVICE AND PRINTER WITH AN LED ARRAY

FIELD OF THE INVENTION

The present invention relates to an LED array for image-wise exposures of a photosensitive layer and, in particular, to LED array having a compensation means for providing uniform light output.

BACKGROUND OF THE INVENTION

Exposure means using LED array is generally known. For example, in U.S. Pat. No. 4,455,562 an LED printer is disclosed. In that printer an image is imaged line by line on a previously charged photoconductive layer by means of an array of LED's which together with part of their control electronics form part of an integrated circuit. Since not all of the LED's emit the same amount of light in response to identical electrical energization, a control circuit is disclosed which controls the pulse time of each LED separately in conjunction with the known light emission of that LED. LED's having lower light emission are energized with longer pulses, and, thus, the total emission per pulse of all the LED's is equalized.

It is known that the light emission of LED's decreases with use, therefore, the light emission of lower output LED's will decline more rapidly than that of the brighter LED's. Also, it is typical for print images to contain areas which are rarely covered with image parts, such as the edges, and areas which almost always contain image parts, e.g., the middle. LED's required to expose the edges are subjected to practically continuous loading, while LED's which have to expose the image parts are loaded less frequently. As a result of these two effects; the light emissions of the separate LED's will be subjected considerably to unequal changes over their life so that a simple aging compensation scheme becomes impossible.

Accordingly, it is an object of the invention to provide an exposure device and a printer in which all of the LED's age equally so that a simple, uniform aging compensation means is possible. The invention is based on the understanding that the LED's have to be brought in an equal state of aging in a period out of the exposure time for forming a latent image on the photosensitive belt.

SUMMARY OF THE INVENTION

The present invention provides a means for compensating the aging of LED's in an LED array. Generally, the invention comprises a a. a first means for determining the cumulative loading of each LED in the array during a specific time interval, b. a second means for determining the cumulative loading of the LED or LED's in the array that are most highly loaded based on the cumulative loading as determined by the first means during said specific time interval [hereinafter being referred to as he "maximum loading"], and c. a third means for subjecting at least all the other LED's of the array individually to an extra loading on the basis of the maximum loading during a correction interval after the specific time interval, such that after expiration of the correction interval all of the LED's hae been subjected to an equal loading and, thus, equal aging.

As a result of the present invention, the differences in the light yield of the LED's due to aging are eliminated or substantially reduced. The decrease in the light yield of the LED's due to aging can be compensated for in all of the LED's, for example, by lengthening all of the energization pulses by an equal amount or increasing the current to all of the LED's. For very rapid systems it is preferable to effect the extra loading by the application of an increased supply current to the LED's. In this way, the aging per unit of time will be greater and the extra loading can thus be completed in less time.

The present invention is especially applicable to printers for increasing the uniformity, quality, and accuracy of the imaged product. Other features and advantages of the exposure device according to the invention will become apparent from a perusal of the following detailed description of a presently preferred embodiment taken in connection with the accompanying drawings, in which like reference numerals refer to like parts.

PRESENTLY PREFERRED EMBODIMENT

Figure 1:
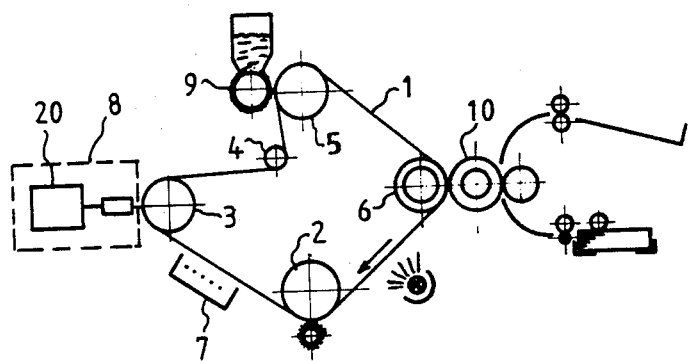
FIG. 1 is a diagrammatic representation of a printer provided with an exposure device according to the present invention.

With reference to FIG. 1 an electrophotographic printer is shown provided with an exposure device 8 according to the invention. Generally, the printer comprises a belt 1 or like means having a photoconductive layer. In the case of a belt, it is preferably trained over five rollers 2, 3, 4, 5 and 6. Roller 2 is typically connected to a motor (not shown) and drives belt 1. Photoconductive belt 1 is given a uniform surface charge in a charging station 7 and is then imagewise exposed by means of exposure device 8, so that charge flows away at the exposed locations. A thin layer of toner powder is then applied to the unexposed locations of belt 1 in developer station 9, and is transferred to and fixed on a sheet of paper in transfer station 10. Obviously, other means can be used to achieve the electrophotographic process and the present invention is applicable to an exposure means or imaging means comprising an array of LED's for use in such process.

Figure 2:
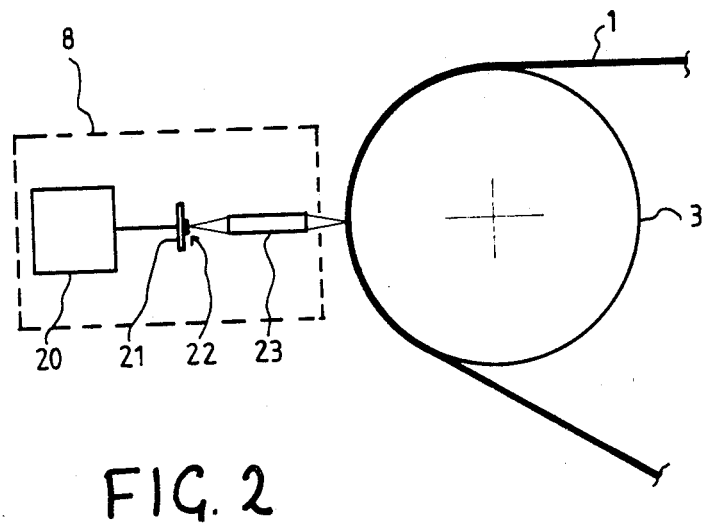
FIG. 2 is an illustration of the principle of the exposure device according to the invention.

Thus, exposure device 8 of the present invention is illustrated in greater detail in FIG. 2. It comprises LED array 21 having a number of LED's 22 spaced apart from each other a distance of about 50 to 100 μm (the longitudinal axis of the array is situated transversely of the drawing plane). The control signals for the LED's are supplied by control unit 20.

As shown in FIG. 2, the light from the LED's is projected on to photoconductive belt 1. For this purpose a selfoc-array 23 is used; that is, a row of optical fibers with a tapering refractive index and functioning as a plurality of lenses. However, FIG. 2 shows only one of those fibers. If LED 22 of array 21 is energized, its light impinges on the charged surface of photoconductive belt 1, so that the charge flows away at that location. By energizing some of the LED's and not others at a specific time it is possible to form a linear charge image. These image lines are imaged one after another on the moving photoconductive belt.

The exposure is made in the form of light pulses each discharging a substantially round spot onto belt 1. In this connection it has been found that in most commercially available LED arrays not all of the LED's yield light of exactly the same intensity. Consequently, the degree of exposure of the photoconductive belt 1 will differ as between each LED. A known solution to this problem is to measure and store in a memory the light emission of each LED. By reference to this information the pulse time for each LED is controlled separately during each exposure. LED's having a high light emission are thus energized with shorter pulses than LED's having a lower light emission. In this way, the total energy output per pulse is equalized for all of the LED's.

Figure 3:
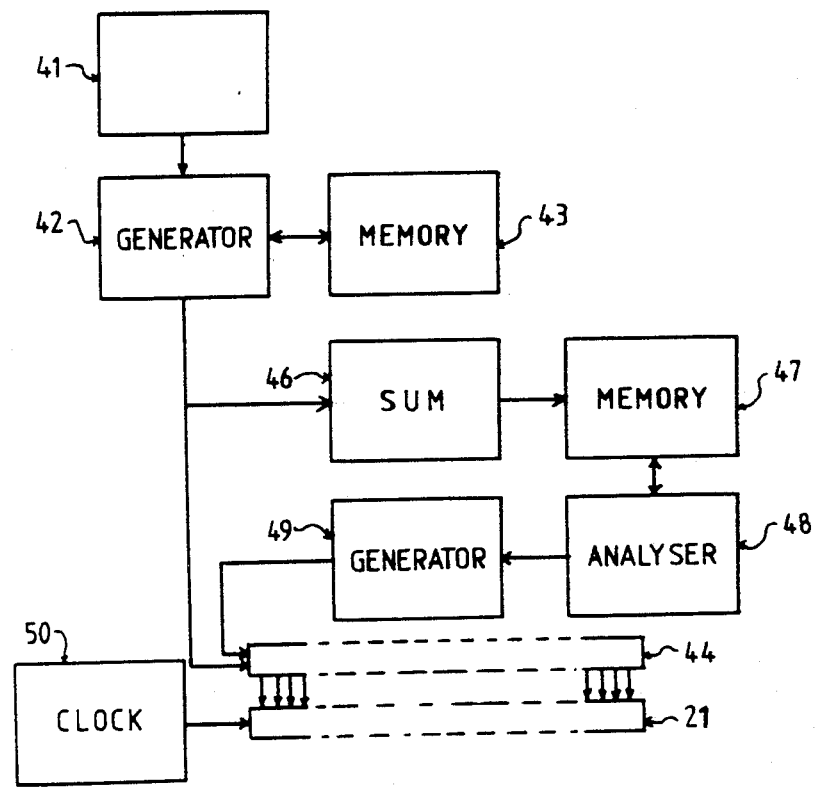
FIG. 3 is a diagrammatic representation of a preferred control unit for use in the exposure device according to the invention.

Referring to FIG. 3, a control unit of an exposure device according to the invention is shown for use in the printer described with reference to FIG. 2. The image information is fed in the form of a raster signal from signal source 41 to signal processing circuit 42 connected to memory 43. The output of signal processing circuit 42 is connected to shift register 44, preferably of the serial-in parallel-out type. The cells of register 44 are each connected to a control circuit of an individual LED in LED array 21, and to summation circuit 46. The summation circuit is connected to cumulative memory 47. A signal generator 49 is connected on the one hand to analyzer 48 which in turn is connected to cumulative memory 47, and on the other hand to shift register 44. An image pulse generator 50 is connected to the control circuits in LED array 21.

An image for printing is described by a matrix of image points which may be black or white. The image information is fed to the exposure device in the form of series of electrical binary signals (image lines) corresponding to the rows of the image matrix. Each image point in an image line corresponds to a specific LED in the exposure device. After an image line has been completely supplied, all of the LED's are programmed according to the image points in the image line. An image point, for example, which is required to be white, is converted into an "on" signal for the corresponding LED, so that the latter exposes charge away from the photoconductive belt 1, so that it will no longer be developed at that location.

Signal source 41 feeds to processing circuit 42 an image line consisting of the binary values of the image points on that line. Processing circuit 42 converts the value of each image point into a pulse time for the corresponding LED, taking into account the energy output of each LED as already described hereinbefore. The data required for this purpose is stored in memory 43.

This signal, which consists of a series of pulse times, is fed to shift register 44, the cells of which are each connected to the control circuit of an LED. On a pulse from image pulse generator 50, each LED is energized for the programmed pulse time. The next image line is then processed in th same way.

Apart from being fed to shift register 44, the signal from processing circuit 42 is also fed to summation circuit 46. The latter is connected to cumulative memory 47, in which the sum of the pulse times already processed for the image in progress is stored for each LED. Each time a new image line is applied the summation circuit 46 adds the new pulse time to the total of processed pulse times for each LED and stores the result in cumulative memory 47. When all the image lines of an image have been processed, the cumulative memeory contains the cumulative loading which each LED experienced during that image.

At the end of the image cycle analyzer 48 comes into operation. It reads out the total pulse time of each LED from the cumulative memory 47 and determines a number of extra pulse for each LED so that the sum of the total pulse time read out of the cumlative memory 47 and the extra pulse time becomes equal for all the LED's. This sum can be brought to a predetermined fixed value, but in view of the aging of the LED's it is preferable not to make the sum larger than strictly necessary. Accordingly, the following method is preferred. Analyzer 48 compares the total pulse times or loading in memory 47 and searches out the longest one. For the LED's having a shorter total pulse time or loading the number of extra pulses or charges required to bring them to a total pulse time or loading equal to the longest total pulse time or loading found is then determined. At the command of the analyzer the signal generator 49 then generates image lines which are built up from the extra pulses or loading required. These image lines are projected onto photoconductive belt behind the image just formed, but are not processed by the printing system, and, hence, they are not developed and transferred. When all the LED's have been brought to a total pulse time or load equal to the longest total pulse time or load, signal generator 49 stops and the printer is ready to reproduce a new image. All the LED's have now had an equal total pulse time or loading and, therefore, have aged equally.

Although the invention has been explained by reference to the above example and the accompanying drawings, it is not restricted thereto. Numerous variations are possible within the scope of the claims, as will be apparent to the skilled addressee. For example, the total pulse time of each LED can also be calculated from the signal from the signal source 41 using the data in memory 43, instead of deriving the same from th signal from the processing circuit 42. The separate signal generator for the extra loading pulses can also be dispensed with, if its function is performed by the electronics used for the image forming. In the example described, the interval of time over which the cumulative loading for each LED is determined, is equal to the time in which an image is exposed, and the correction interval in which the LED's subjected to less loading receive extra loading in the form of extra pulses, is equivalent to the time elapsing between forming the image and the next image. Of course it is also possible to determine the cumulative loading of each LED over a longer interval of time, e.g., over 100 images, after which the extra loading can be effected within a sufficiently short time by applying an increased supply current.

Accordingly, the invention may be otherwise embodied within the scope of the appended claims.

What is claimed is:

1. An exposure device for the image-wise exposure of a photosensitive layer by means of an LED array, each LED in the array being energized in accordance with the image information to be reproduced, comprising:
    a. first means for determining the cumulative energization level of each LED during a specific time interval,
    b. second means electrically connected to said first means for determining the cumulative energization level of the LED or LED's in said array having the greatest energization level during said specific interval of time; and c. third means connected to said second means for energizing individually at least each of the other LED's of the array to an additional energization during a correction interval after said specific time interval, said additional energization being equal to at least the difference between the energization level of the individual LED and said greatest energization level.

2. An exposure device according to claim 1, in which said LED's are energized by a fixed supply current during exposure of said photosensitive layer and whereby said determination of said cumulative energization level or maximum level is equal to the cumulative energization time or maximum energization time, respectively.

3. An exposure device according to claim 2, wherein said additional energization is equal to an energization for a time which makes the cumlative energization time after expiration of the correction interval equal for all the LED's.

4. An exposure device according to claim 3, wherein said additional energization time for each LED is equal to the difference between the maximum energization time and the cumulative energization time of that LED.

5. An exposure device according to claims 1, 2, 3 or 4, wherein said extra energization of said LED's is effected by application of an increased supply current to said LED's.

6. A printer comprising a photosensitive belt for forming images thereon by means of an exposure device according to claim 1, 2, 3 or 4, wherein the images formed on the belt are separated by gaps having a time interval equal to the amount of time required for said correction interval of said exposure device.

* * * * *